United States Patent [19]

Nolte et al.

[11] Patent Number: 4,938,086

[45] Date of Patent: Jul. 3, 1990

[54] WINDOW OPERATOR

[75] Inventors: Douglas A. Nolte, Owatonna, Minn.; Dennis J. Rooney, Sterling, Ill.; Christopher T. Sandberg, Owatonna, Minn.

[73] Assignee: Truht Incorporated, Owatonna, Minn.

[21] Appl. No.: 371,619

[22] Filed: Jun. 26, 1989

Related U.S. Application Data

[60] Division of Ser. No. 187,429, Apr. 28, 1988, Pat. No. 4,843,703, which is a continuation-in-part of Ser. No. 70,411, Jul. 7, 1987, Pat. No. 4,845,830.

[51] Int. Cl.⁵ ............................................. F16H 29/02
[52] U.S. Cl. .................................... 74/89.14; 49/341; 49/342; 403/161; 403/162
[58] Field of Search ................ 49/341, 342, 345, 349, 49/350, 351; 403/161, 162, 276, 282; 74/89.14; 29/432, 432.1, 505, 509, 512, 522.1, 525.1

[56] References Cited

U.S. PATENT DOCUMENTS

| | | | |
|---|---|---|---|
| 1,057,030 | 3/1913 | Bohm | 403/162 X |
| 1,108,663 | 8/1914 | Ashman | 403/162 X |
| 1,897,442 | 2/1933 | Saunders | 403/162 |
| 2,082,066 | 6/1937 | Lackey | 74/89.14 |
| 2,331,382 | 10/1943 | Eubanks | 403/162 X |
| 3,181,390 | 5/1965 | Juy | 403/162 X |
| 4,840,075 | 6/1989 | Tucker | 49/341 X |

Primary Examiner—Mark Rosenbaum
Assistant Examiner—Frances Chin
Attorney, Agent, or Firm—Wood, Phillips, Mason, Recktenwald & VanSanten

[57] ABSTRACT

A window operator and assembly method therefor wherein a stacked pull arm and gear are rotatably mounted on a bushing carried by a mounting base and the gear and pull arm are assembled to the mounting base with a controlled clearance independent of the tolerance of these components by use of a hardened metal bushing. The hardened metal bushing is forced into the deformable metal of the mounting base whatever distance is necessary to locate an exposed end of the bushing a fixed distance beyond the uppermost of said gear and pull arm and provide a surface against which a washer may be mounted and which overlies the pull arm and gear to hold the components in assembled relation with the controlled clearance.

3 Claims, 1 Drawing Sheet

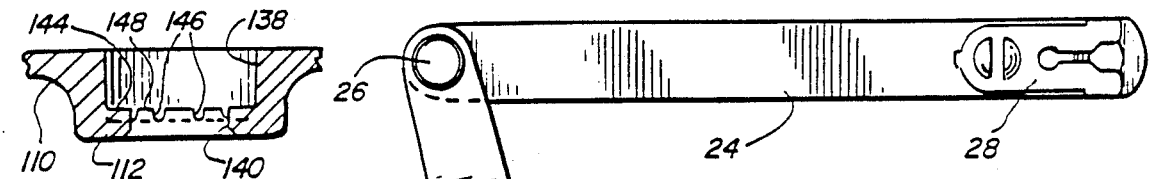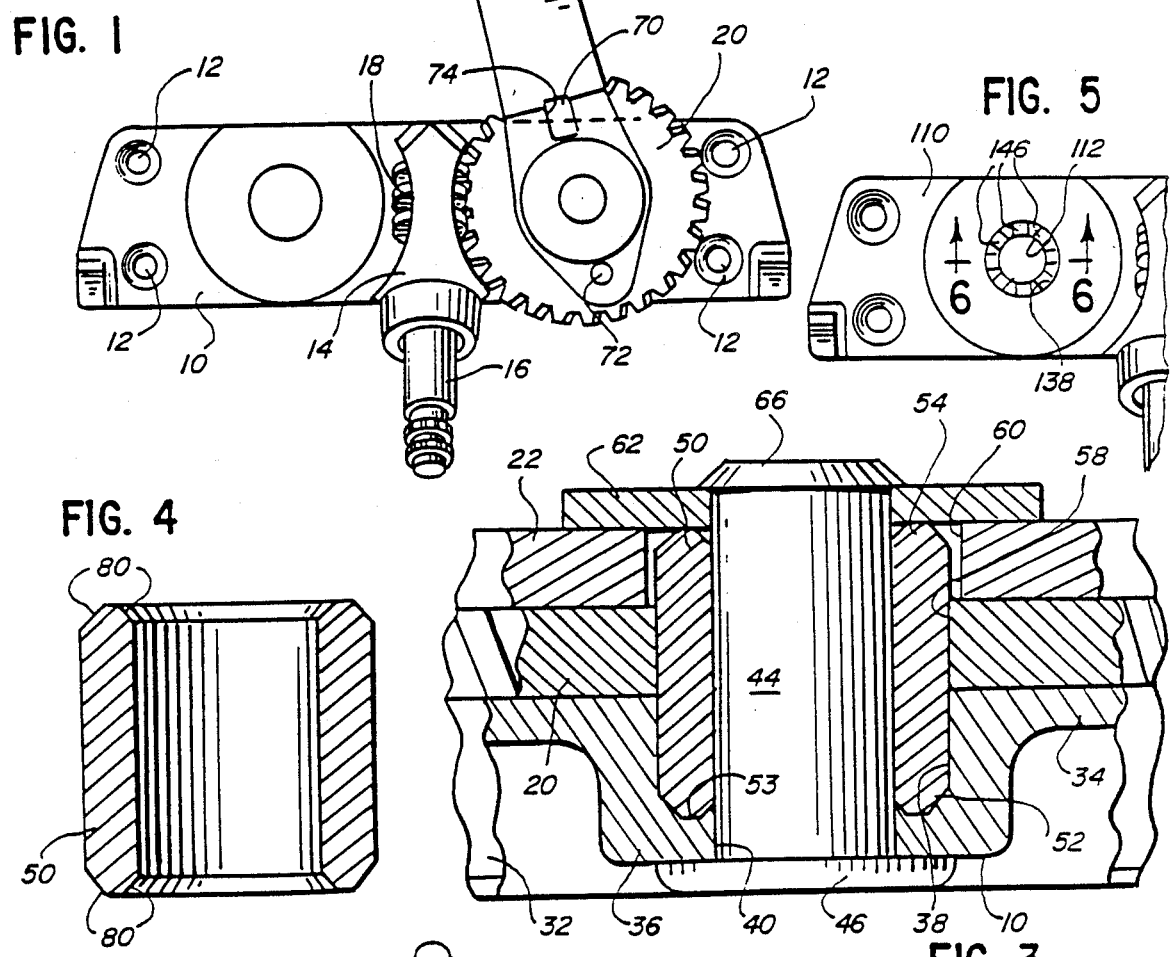

WINDOW OPERATOR

CROSS REFERENCE

This is a division of Ser. No. 187,429, filed Apr. 28, 1988, now U.S. Pat. No. 4,843,703 which is a continuation-in-part of our co-pending application Ser. No. 070,411, filed July 7, 1987 U.S. Pat. No. 4,845, entitled "Window Operator and Assembly Method".

1. Field of the Invention

This invention pertains to a window operator and a method of assembly thereof utilizing a metal bushing on which stacked rotatable components are mounted and which is forced into the deformable metal of a mounting base to provide a controlled clearance for the stacked components and reduce play which would otherwise occur because of a build-up of tolerances of the components.

2. Background of the Invention

Manually operable window operators for casement and awning type windows are well known in the art. It is typical of such a window operator to have a mounting base which rotatably mounts a gear and pull arm. The gear meshes with a worm gear on a worm shaft having a handle affixed thereto and a pull arm is operatively connected to a window whereby rotation of the worm shaft results in rotation of the gear and the pull arm for window movement.

In a specific form of window operator of this type, a pin extending upwardly through a recess in the mounting base mounts a bushing and a stacked assembly of the gear and pull arm each having an opening are rotatably associated with the mounting base by positioning on the bushing. A washer is secured to the pin in overlying relation to the gear and pull arm to complete the assembly of the window operator The association of the washer with the pin must be at a location lengthwise of the pin to take into account the extreme amounts of tolerance resulting from tolerance variations in the thickness of the blank from which the gear is made and the thickness of the metal from which the pull arm is formed. This can result in a window operator having a considerable amount of play axially of the bushing which is undesirable in a window operator.

SUMMARY OF THE INVENTION

A primary feature of the invention is to provide a window operator and a method for assembling such operator wherein the stacked components are assembled with a controlled clearance to reduce play therebetween and by use of a metal bushing about which a gear and pull arm of the window operator may rotate and which is forced into the deformable metal of a mounting base of the operator to establish a controlled distance of an exposed end of the bushing beyond the stacked gear and pull arm. A washer is fixed to a mounting pin to overlie the stacked gear and pull arm and in abutting relation with the exposed end of the bushing to achieve a controlled clearance determined by the extent to which the bushing has been forced into the mounting base.

An object of the invention is to provide a method of assembling a stacked pull arm and gear of a window operator to a mounting base of deformable metal with a controlled clearance for rotational movement of the pull arm and gear about a pin associated with the mounting base without excessive play and with said pull arm and gear each having a mounting opening comprising, positioning a hardened metal bushing on said pin and in said openings of the pull arm and gear with one end of the bushing in a recess in said mounting base and the other end extending beyond the gear and pull arm, and exerting a force on said other end of the bushing to force said one end of the hardened metal bushing into the deformable metal of the mounting base to advance said other end until said other end extends beyond said gear and pull arm a predetermined distance, and fixing a washer to said pin in engagement with said other end of the hardened metal bushing and overlying the gear and pull arm to hold the gear and pull arm in assembled relation with the mounting base.

Still another object of the invention is to provide a method as defined in the preceding paragraph wherein the forcing of the hardened metal bushing into the metal of the mounting base causes a flow of the deformed metal and the end of the bushing has a bevel to provide a space into which the deformed metal may flow.

Still another object of the invention is to provide a window operator having controlled clearance between components, said components including a mounting base of deformable metal, a gear and a pull arm each having an opening and which are in stacked relation, a pin fixed to the mounting base, a hardened metal bushing on said pin and extended through said openings, and a washer fitted onto said pin and engaging said bushing, said hardened metal bushing having a bevelled end pressed into and deforming the metal of said mounting base to have an exposed end of the hardened metal bushing a predetermined distance beyond the uppermost of said stacked gear and pull arm.

A still further object of the invention is to provide a seat for the hardened metal bushing in the mounting base that is readily deformable to facilitate locking of the bushing to the mounting base and pin without weakening the mounting base. The seat, in cross section, has an upwardly opening, U-shaped configuration with an opening in the base wall of the U to permit passage therethrough of the pin. At least one recess is formed in the base wall of the U to provide a space for the flow of the deformable metal of the mounting base upon the hardened metal bushing being forcibly urged against the base wall of the seat during assembly.

DESCRIPTION OF THE DRAWINGS

FIG. 1 is a plan view of the window operator with a handle omitted;

FIG. 2 is front elevational view of the structure shown in FIG. 1 with parts broken away and shown in section;

FIG. 3 is an enlarged view of that part of FIG. 2 which is shown broken away and in section;

FIG. 4 is a central sectional view of the hardened metal bushing on the scale of FIG. 3;

FIG. 5 is a fragmentary plan view of a modified form of window operator, according to the invention, with a handle omitted; and FIG. 6 is an enlarged, fragmentary, sectional view of a seat for the hardened metal bushing taken along line 6—6 of FIG. 5.

DESCRIPTION OF THE PREFERRED EMBODIMENT

The window operator is shown generally in FIGS. 1 and 2 and has a mounting base 10 formed of a deformable metal such as zinc and which, for ease of manufacture, is formed for mounting of components to provide either a right hand or left hand operator with a left hand operator being shown in the drawings. The disclosed window operator is for mounting under a window sill cover and thus being hidden from view does not require a cover although the principles of the invention disclosed herein are applicable to exposed window operators having a cover. The mounting base 10 has openings 12 for receiving fasteners which attach the mounting base to window framing and a central upwardly angled generally tubular section 14 which rotatably mounts a worm gear shaft 16 having an exposed end to which a handle can be mounted and having a worm gear 18 exposed through open sides of the tubular section 14 for meshing with a gear 20. Rotation of the worm gear 18 causes rotation of the gear 20 with resulting rotation of a pull arm 22 which has a drag link pivotally connected thereto at a pivot connection 26. The drag link 24 has a keeper sub-assembly 28 at a free end thereof to enable connection of the drag link to a slide or other member 20 associated with the window. Such a keeper structure is well known in the art and is of the type shown in Armstrong Patent No. 3,461,609. Alternatively, a snap-stud connection can be used to releasably retain the end of the drag link 24 on the slide or other member on the window sash. The snap-stud connection referrred to is described in detail in U.S. Pat. No. 4,593,341, to Sandberg et al.

The gear 20 and pull arm 22 are rotatably mounted on the mounting base 10 by structure shown particularly in FIGS. 2 and 3.

The mounting base has a perimetral flange 32 to provide a raised base panel 34 with a downwardly formed section 36 having a recess 38 and an end wall with an opening 40. A pin 44 extends through the opening 40 and has a head 46 abutting the formed section 36. A hardened symmetrical metal bushing 50 surrounds the pin 44 and has one end 52 engaged with the formed section 36 of the housing 10 and the other end 54 is positioned slightly above the upper surface of the pull arm 22. The gear 20 has an opening 58 to mount the gear on the bushing 50 and the pull arm 22 has a slightly larger opening 60 to enable positioning thereof in surrounding relation to the bushing 50.

A washer 62 is positioned on the pin 44 in overlying relation to the pull arm 22 which is the uppermost component of the stacked pull arm and gear and engages the end 54 of the bushing and is held in assembled relation by a deformed end 66 of the pin which can be deformed by a spin operation known in the art.

The gear 20 and pull arm 22 are interconnected for rotation together by a pair of slugs 70 and 72 fitted in openings in the pull arm 22 and which depend downwardly from the lower surface thereof to engage in openings in the gear 20. The slug 70 is generally rectangular and engages in a generally rectangular slot 74 in the gear and a second opening in the gear receives the slug 72.

The gear 20 is formed from a gear blank and the pull arm 22 is formed from a sheet of metal such as steel and with there being tolerance variations in the thickness of both the gear blank and the metal sheet. In order to avoid play in the gear and pull arm which could result from an assembly of the window operator with the washer 62 at a predetermined fixed distance from the head 46 of the pin which is set to take into account maximum thickness of the gear end pull arm, the novel method of assembly provides for use of the hardened metal bushing 50. The metal bushing can have the end 52 thereof forced into the deformable metal of the mounting base 10 until the end 54 of the bushing is a predetermined distance beyond the upper face of the pull arm 22. This establishes a controlled clearance wherein the tolerance of each of the gear and pull arm is not critical.

More particularly, the assembly method comprises pre-pressing the bushing 50 into the recess 38 so that the lower end 52 of the bushing 50 is above the bottom 53 of the recess 38 and thereafter assembling the pin 44 on the mounting base 10 and the gear 20 and pull arm 22 on the bushing. Pre-pressing of the metal bushing assures that the bushing is situated in as near vertical position as possible. The pre-pressed bushing 50 also provides a stable mount for the pin 44, gear 20, and pull arm 22. By means of a tool or manually, a force is then exerted on the end 54 of the bushing and reacted by the head 46 of the pin engaging a support surface and sufficient force is applied to cause advance of the lower end 52 of the bushing into the deformable metal of the base until the end 54 of the bushing extends beyond the upper face of the form 22 a predetermined distance, such as 0.005 inches, for example. The washer 62 is then applied to the pin and fixed thereto by deforming the end 66 of the pin 44. With this assembly method, variations in the tolerance of the gear and pull arm are not critical and in assembling each window operator, the bushing 50 can be advanced whatever distance is necessary to provide the controlled projection of the end 54 thereof. The operation is enhanced by providing internal and external bevels 80 at each end of the bushing 50 whereby either end of the bushing can be initially inserted into the recess 38 of the mounting base. The bevels provide a space for flow of deformable zinc or other metal of the mounting base as seen in FIG. 3 with resulting locking of the bushing to the mounting base and to the pin 44.

Alternatively, the pin can be initially assembled to the mounting base after which the bushing 50 is positioned on the pin 44 and the gear 20 and pull arm 22 are mounted on the bushing 50. A force is then exerted on the bushing end 54 to effect deformation thereof in the same manner as described in the preceding paragraph.

As mentioned previously, the exposed end of the hardened metal bushing can be, for example, 0.005" above the stacked pull arm and gear. This provides for adequate freedom of rotation of the pull arm and gear. In the prior art structure there could be a tolerance build-up of 0.028" and allowance for this could result in excessive play in the components of the window operator A modified form of mounting base 110 is shown in FIGS. 5 and 6. The base 110 is the same as the base 10 previously described in all respects with the exception of the configuration of the wall 112 at the bottom of the recess 138 in the mounting base 110 defining the seat for the pin 44 and hardened metal bushing 50. The recess 138 has an upwardly opening U-shape in cross section with the bottom wall 112 at the base of the U having an opening 140 to facilitate passage therethrough of the pin 44.

The upwardly facing surface 144 of the wall 112 has a plurality of radially outwardly opening V-shaped recesses 146 formed therein of a depth equal to less than one half the thickness of the wall 112. In the embodiment shown in FIGS. 5 and 6, multiple recesses 146 are shown equidistantly spaced around the wall 112.

Assembly of the window operator is carried out in the same manner as with the embodiment in FIGS. 1-4. Upon the bushing lower end 52 engaging the upwardly facing surface 144 of the base 110 and being pressed forcibly downwardly thereagainst, raised portions 148 of wall 112 between adjacent recesses 146 are deformed so as to flow into the recesses 146 with resulting locking of the bushing 50 to the mounting base 110 and pin 44.

The recesses 146 in combination with raised portions 148 facilitate assembly of the operator without causing detrimental weakening of the wall 112. The recesses 146 and raised portions 148 are particularly advantageous where the mounting base 110 is made from a relatively deformable metal, for example, a zinc die casting. During the assembly process, pressure from the bushing lower end 52 is alleviated by cold flow of the raised portions 148 into adjacent recesses 146.

We claim:

1. A window operator having controlled clearance between components, said components including a mounting base of deformable metal, a gear and a pull arm each having an opening and which are in stacked relation, a pin fixed to the mounting base, a hardened metal bushing on said pin and extended through said openings, and a washer fitted onto said pin and engaging said bushing, said hardened metal bushing having a bevelled end pressed into and deforming the metal of said mounting base to have an exposed end of the hardened metal bushing a predetermined distance beyond the uppermost of said stacked gear and pull arm.

2. The window operator of claim 1 wherein said mounting base has a wall which is deformed by the bushing and the wall has a Crecess defining a space into which the mounting base metal flows upon said wall being deformed by the bushing.

3. The window operator of claim 2 wherein there are a plurality of said recesses in a circular array to underlie the bevelled end of said hardened metal bushing.

* * * * *